Aug. 8, 1933.  S. W. SPARKS  1,921,846
VALVE
Filed Dec. 30, 1929  4 Sheets-Sheet 3

INVENTOR:
Stanley W. Sparks,
BY
His ATTORNEY.

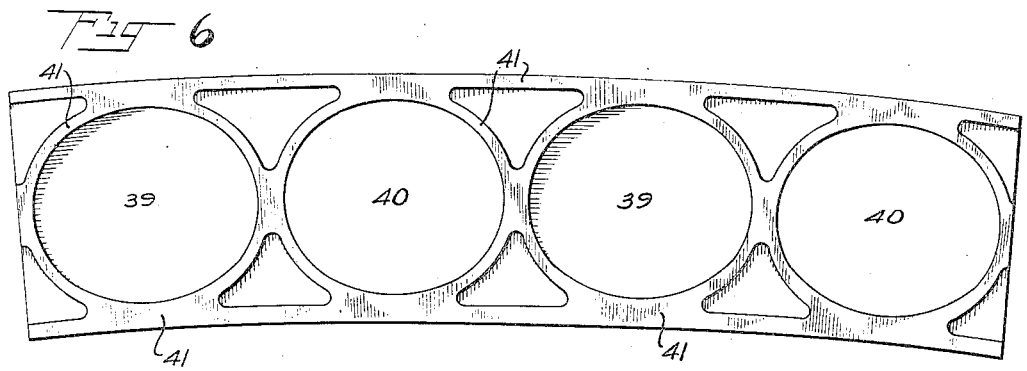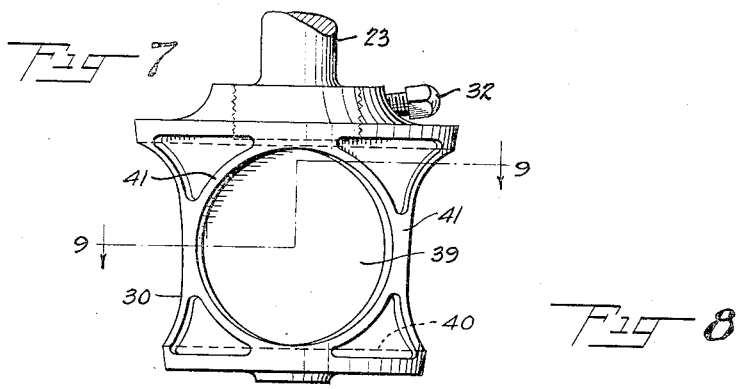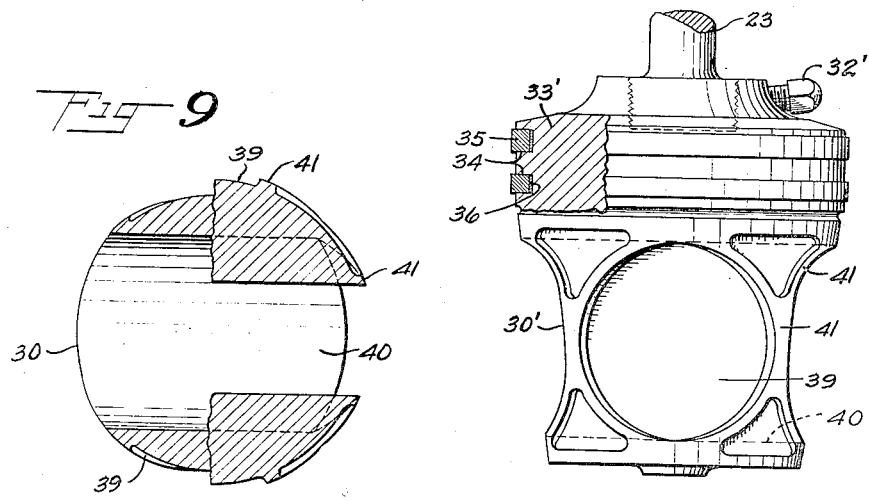

Patented Aug. 8, 1933

1,921,846

UNITED STATES PATENT OFFICE 1,921,846

VALVE

Stanley W. Sparks, Norwalk, Conn., assignor to Charles H. Bickell, trustee

Application December 30, 1929. Serial No. 417,542

2 Claims. (Cl. 251—101)

This invention relates to valve mechanisms and more especially to that type intended for high pressure and high temperature duty in refineries, power plants, pumping plants, chemical works and the like to replace cast and forged gate and globe valves and other standard types of valves as now generally used and has for its particular objects the provision of a mechanism which is adaptable for high, intermediate or low pressure service, is of universal application, being capable of replacing the usual types of valves and which valve is sturdy, resistant to distortion and permanent set under high pressure and temperature conditions, is readily opened and easily operated, is extremely simple in construction and economical to manufacture, besides being light and cheap to install and having other advantages hereinafter set forth.

My invention is more fully set forth and described in the following specification and drawings forming a part thereof, in which latter Figure 1 is a central, vertical section of an integral-hub, piston plug valve embodying my invention;

Figure 6 is a developed view of the tapered plug;

Figure 7 is an elevation of the plug member shown in Fig. 1, isolated;

Figure 8 is a similar view of a modified form of plug member;

Figure 9 is a horizontal section on the line 9—9 of Fig. 7; and

Figure 10 is a plan view on line 10—10 of Fig. 1.

Figure 1:
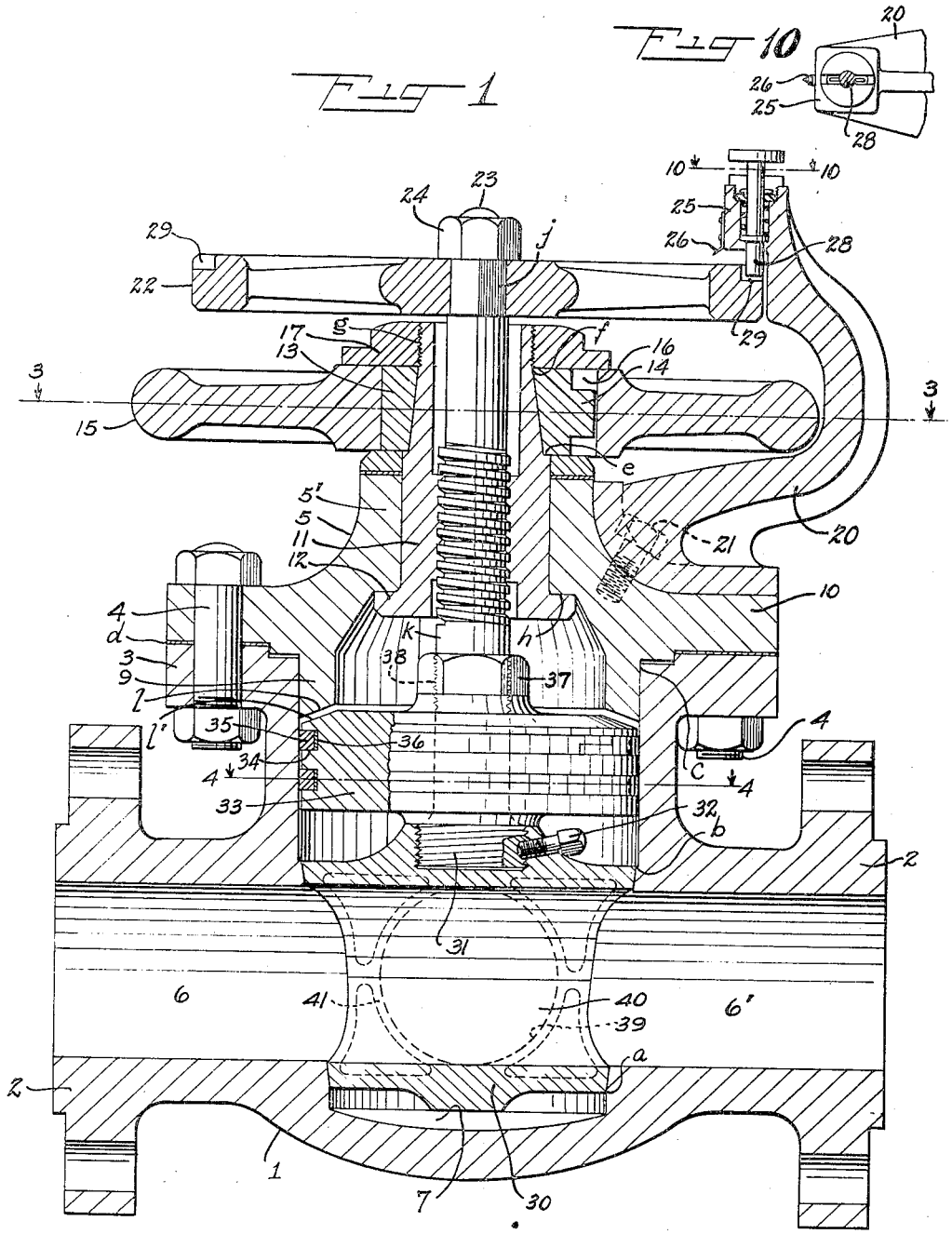

Referring to the drawings and the construction shown therein, the reference numeral 1 designates a valve body either forged or cast, the same having flanged hub members 2 and a top flange 3, each of which flanges is apertured to receive bolts, such as the bolts 4, that serve in the usual manner to secure said hubs to the line connections and to secure the top flange 3 to a bonnet member 5, respectively. The hubs are centrally pierced to form longitudinal fluid ways, 6, 6' that respectively intersect a valve chamber 7 of cylindrical configuration at its lower end and which is, at the intermediate portion thereof, i. e. between the levels indicated by the reference letters $a$ and $b$, of a configuration conforming to that of a truncated cone while between the levels indicated by the reference letters $b$ and $c$, it is again of cylindrical shape.

The bonnet 5, which has an unusually short neck or throat portion 5' and a depending annular rib 9 and apertured flange 10, is bolted in the usual manner to said top flange 3 of the valve body. A compression gasket $d$ of any well known type is interposed between the said flange 10 of said bonnet and said flange 3 to assist in sealing the joint therebetween. A revolving bushing 11 having a bottom flange 12 is rotatably mounted in the throat 5' of said bonnet, said bushing being pyramidal between the levels $e$ and $f$ thereof and cylindrical at its upper end $g$, which latter is threaded for the purpose hereafter set forth. A seat-cracking collar 13, which has a pyramidal central aperture, snugly fits over and co-operates with the pyramidal portion of said bushing. The periphery of said collar is circular throughout except for a marginal lug 14 projecting outwardly therefrom. A handwheel 15, which is centrally recessed to receive said collar 13, is provided with an arcuate slot 16 which permits of preliminary movement of said handwheel without effecting the corresponding movement of said seat-breaking collar, whereby it is possible, as hereinafter described, to produce one or more hammer blows upon said lug 14 of said collar 13 and thereby easily effect the "breaking" or unseating of the piston.

A flanged retaining-nut 17 is screwed upon the threaded upper threaded end $g$ of said bushing, the same serving to support said bushing so that its lower flange is held in contact with the shoulder $h$ of said bonnet member as well in engagement with the top face of the handwheel 15 which latter is confined thereby.

A bracket arm 20 is bolted or otherwise secured to the flange 10 of said bonnet, and for this purpose preferably one of the bolts 4 is employed, the same being supplemented by cap screws 21. This arm spans the aforesaid handwheel 15 and extends into proximity to a secondary handwheel 22, which latter is secured to a valve stem 23 by means of a nut 24 and is adapted to effect the simultaneous rotation of said valve stem and said bushing 11 when desired without raising or lowering either said stem or a piston gate, hereinafter described, carried by said stem. The upper end of said bracket is provided wtih a boss 25 equipped with an index pointer 26 adapted to travel over the dial 27 on the upper face of the handwheel 22. Said boss 25 is recessed to receive a spring-pressed pin or bolt 28, that is adapted to enter or engage peripheral index slots 29 on said upper handwheel 22, whereby said valve stem and the valve carried thereby can be locked in any predetermined position during the raising and lowering of said piston gate to and from its seat. As shown, the portion $j$ of the stem 23 is of rectangular configuration so that when said handwheel 22 is fitted thereover and the nut 24 is screwed home on said handwheel, the independent rotation of said handwheel, relative to said stem, will be prevented.

On the lower end of said stem 23 is a valve plug member 30 which has an external configuration conforming to that of an inverted truncated cone, the same being preferably threaded onto a terminal threaded portion 31 of said stem and being held in a predetermined indexed position thereon by means of one or more set screws 32. Immediately above the said plug, and seated thereon, is a piston member 33 which is provided with peripheral grooves 34 to receive piston rings 35 and, preferably, metallic packing rings 36 are interposed between said piston rings and the base of the grooves 34 in which said rings are carried. A nut 37 serves to hold said piston and said plug 33 in tight engagement with each other, said nut being adapted to engage the threaded portion 38 on the enlarged portion $k$ of said stem.

As shown in Figs. 6 to 9 inclusive, the seating area of the periphery of said valve plug is reduced so as to form recesses 39 around the peripheral face of said plug, thereby affording narrow seating strips or pads 41, and preferably the width of which at any portion does not substantially exceed the maximum width between the fluid way 40 which is formed in such plug and the nearest recess 39.

The bonnet is preferably provided with an integral depending cylindrical sleeve 9 which is bevelled on its lower face 1 to correspond to a bevel 1' around the margin of the top of said piston and the length of said flange is such that when the valve plug is unseated the two bevelled faces 1 and 1' will engage each other.

Figure 2:
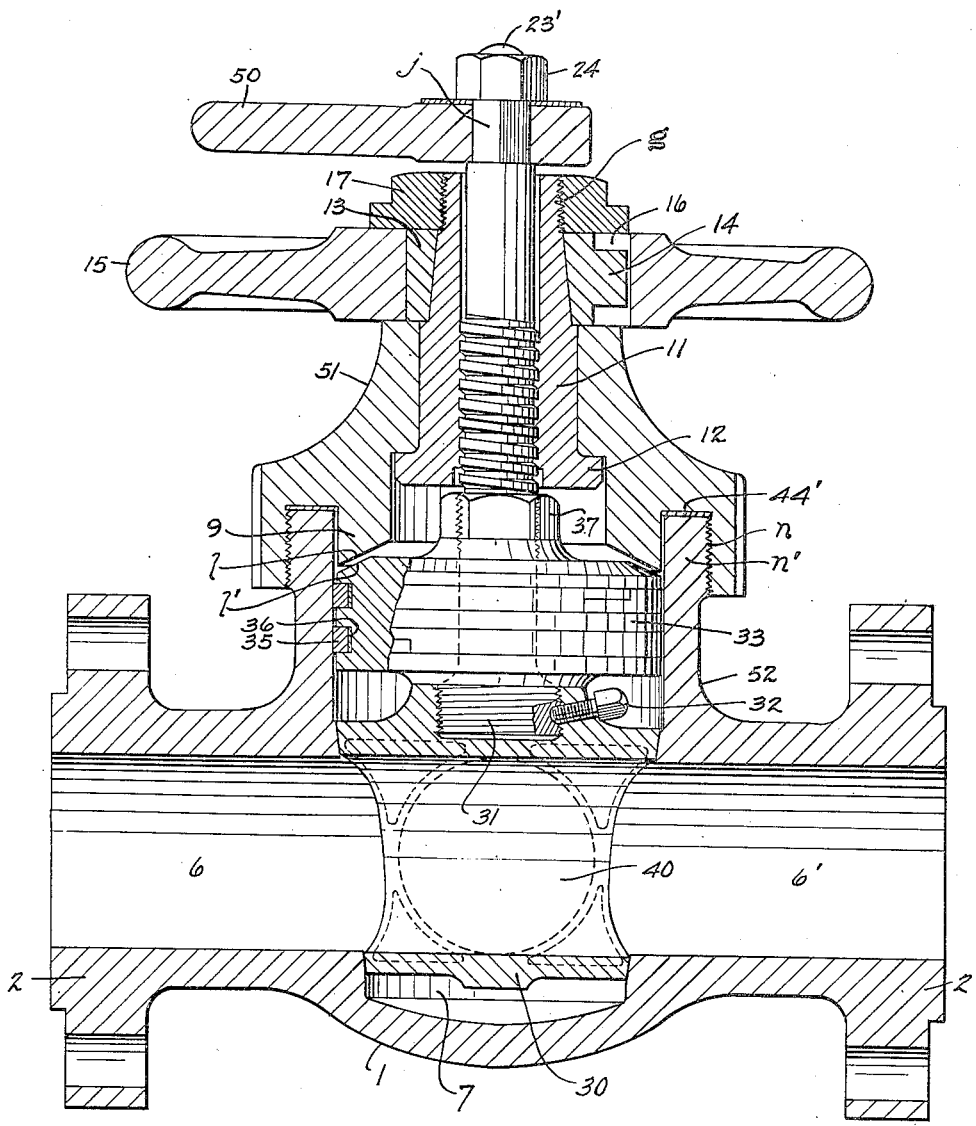
Figure 2 is a similar view of a modification in which the bonnet member is directly threaded to the valve body.
Figure 3:
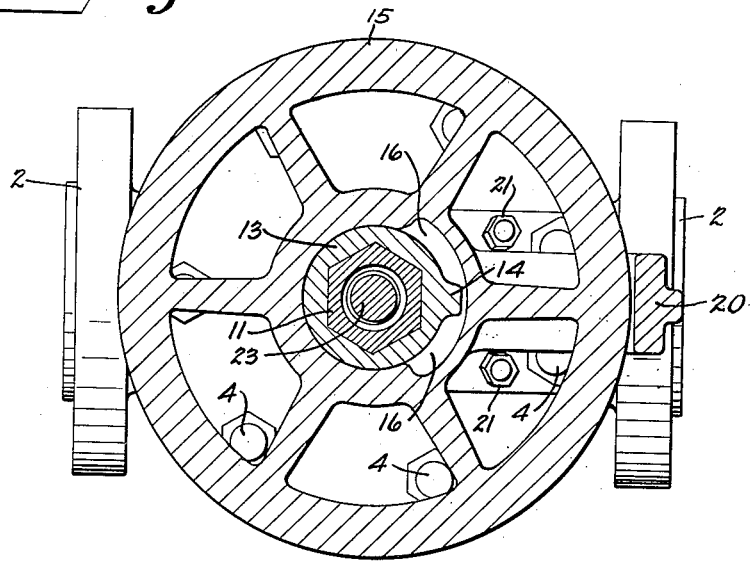
Figure 3 is a horizontal section on the line 3—3 of Fig. 1.
Figure 4:
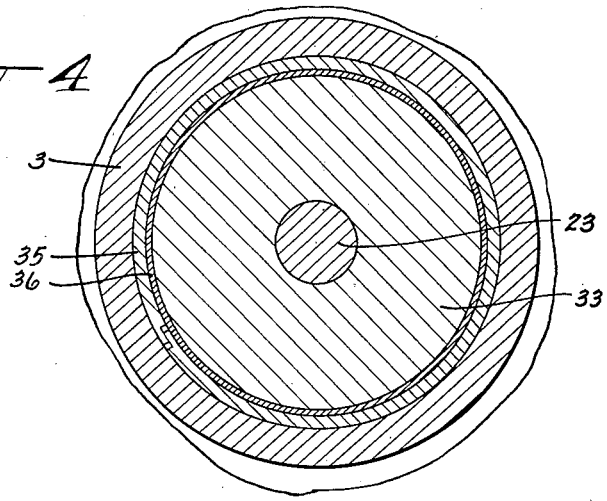
Figure 4 is a horizontal section on the line 4—4 of Fig. 1.
Figure 5:
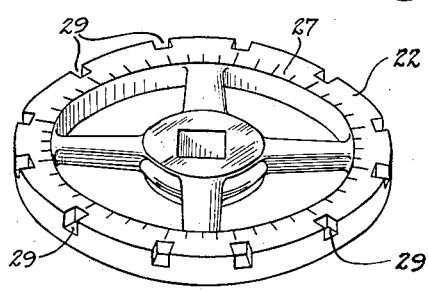
Figure 5 is a perspective view of the handwheel of the construction shown in Fig. 1.

In the construction shown in Fig. 2, the bracket and the co-operating handwheel are dispensed with a single indexing lever 50 is employed to operate the valve stem 23' and effect the rotation thereof to the desired position after the same is unseated without elevating or lowering the valve plug. Furthermore in this latter construction the bonnet 51 is provided with an annular slot which is threaded on its outer face $n$ to receive the threaded upper end $n$ of the body 52 in lieu of being bolted thereto in the customary manner shown in Fig. 1. In this valve, also, the compression gasket 44' serves to prevent the escape of fluid under pressure into contact with the threads of the bonnet 51 and the valve body 52 thereby eliminating the possibility of corrosion therefrom.

In the modified construction shown in Fig. 8, a piston 33' having an integral plug member 30' is shown, the same being secured to the valve stem by a cap screw 32'.

In the operation of my improved valve as shown in Fig. 1 the operator first grasps the hand-wheel 15 and exerts one or more sharp blows on the collar 14 by the sudden clockwise rotation of the hand wheel and said collar 14 thereby effects the slight elevation of the plug off its seat, which permits of the free rotation of the plug, piston and valve stem, by the rotation of the hand-wheel 22 or hand lever 50, into any predetermined open position as indicated by the dial. Thereupon the plug is reseated by the anti-clockwise rotation of said hand wheel 15. The bracket 20 and its locking pin 28, shown in Fig. 1, serve to prevent any rotary movement of the valve during the seat-breaking or re-seating operations. To close the plug gate on its seat, the same operations are followed.

The foregoing construction is suitable for use not only to replace wedge gate valves which are usually employed in those cases where definite and positive closing of the valve is necessary, particularly under high pressure and elevated temperature conditions, but also to replace globe valves intended for the close throttling of fluids as well as for use as a shut-off cock where quick manipulation of the valve is desirable.

The piston gate principle herein described possesses many fundamental advantages over all types of valves now in use, among which are its universality of application as above explained; the simplicity and ease of its operation, it requiring but a few seconds to rotate the valve from one position to another, including the time for reseating the same after location is made; its initial first cost, as well as its economy of installation and maintenance; its remarkable strength and longevity; its freedom from distortion or deformation under high temperature and pressure conditions, especially because of the manner in which the close-fitting piston uniformly supports and reinforces the wall of the valve chamber; the reduction in the fire hazard from external causes, due to the absence of packings and gaskets that are perishable at high temperatures; the ample protection of the seats on the face of the plug and the co-operating seats on the wall of the valve chamber against the deleterious action of injurious fluids, as well as the fact that any scale eroded from the pipe lines which enters the valve tends to collect in the recessed portions of the plug surface and not to accumulate upon the valve-seats; the ease with which the seat-breaking collar effects the breaking of the valve seat under any and all conditions; the prevention of the passage of fluids into the upper portions of the valve body due to the tight fit of the piston and the sealing fit of its auxiliary seat; gland and gasket leakages are avoided and the elimination of an elevated superstructure required ordinarily to carry the gland and stuffing box, whereby the total weight of the valve is very greatly reduced; and finally the simplicity of the construction whereby the actual number of parts is substantially but a quarter of that commonly found in other valves such for example as the O. S. & Y. type of wedge gate valve.

Various modifications and changes in construction within the scope of the appended claims may be made without departing from the spirit of the invention herein described.

Having thus described my invention, what I claim and desire to obtain by United States Letters Patent is:

1. In a valve mechanism, the sub-combination comprising a valve body having a valve chamber therein, a rotating plug member, having a fluid way extending therethrough mounted in said valve chamber and having separate areas of its lateral surface depressed below the normal limits of said surface so as to form a series of continuous curvilinear seating pads and certain of said seating pads being so disposed as to completely surround the respective ports of said fluid way and others of said seating pads being interposed between the seating pads surrounding said ports, the function of such other pads being to reinforce the plug, and all of said seating pads serving to form a continuous series, the pads being interconnected at the points of tangency thereof, whereby the margins of said fluid ways will be completely surrounded by said seating pads and an effective seal between said pads and the inner surface of a valve chamber within which such plug is mounted will be afforded.

2. In a valve mechanism, the sub-combination comprising a plug member corresponding generally in configuration to that of an inverted truncated cone and having a fluid way extending centrally therethrough and having terminal ports of curvilinear configuration and the lateral surfaces of said plug at portions intermediate the opposing terminal ports of said fluid way being cut away to form a plurality of depressed areas which constitute a series of contiguous curvilinear seating pads, certain of which immediately surround the respective ports of said fluid way and others of which are interposed between such latter pads and function to reinforce the plug, all of said pads forming a continuous series, the respective pads being interconnected at their points of tangency and the total area of which is considerably less than one-half of the total lateral surface of said plug.

STANLEY W. SPARKS.